United States Patent
Tanguay

[15] 3,693,743
[45] Sept. 26, 1972

[54] OSCILLATING TANDEM WHEELS

[72] Inventor: Jean-Paul Tanguay, St-Prime, Quebec, Canada

[73] Assignee: Placements Jean-Paul Tanguay Ltee, Comte de Roberval, Province of Quebec, Canada

[22] Filed: Sept. 25, 1970

[21] Appl. No.: 75,475

[52] U.S. Cl. ................................................180/24.05
[51] Int. Cl. ................................................B62d 61/10
[58] Field of Search......180/15, 16, 22, 24.01–24.13, 180/5 A, 33 R, 9.24; 280/104.5 R; 143/43 R

[56] References Cited

UNITED STATES PATENTS

| | | | |
|---|---|---|---|
| 2,554,785 | 5/1951 | Leliter | 180/24.05 |
| 2,280,741 | 4/1942 | Bolster et al. | 180/24.05 |
| 2,426,342 | 8/1947 | Couse | 180/24.02 |
| 3,224,523 | 12/1965 | Ross | 180/33 |
| 3,584,699 | 6/1971 | Ulrick | 180/15 |

*Primary Examiner*—Kenneth H. Betts
*Attorney*—Raymond A. Robic

[57] ABSTRACT

For a heavy vehicle such as a mobile tree slasher there is provided a device which is adapted to facilitate the traction of such vehicle over rough and irregular surfaces. The device consists of a pair a oscillating tandem wheels and should be capable of allowing free oscillation of the tandem wheels about an axis which is located substantially between the axis of both tandem wheels. The heavy vehicle has a power arrangement which is connected to drive at least one and preferably both of the oscillating tandem wheels while allowing free oscillation to the tandem wheels.

8 Claims, 6 Drawing Figures

INVENTOR
Jean-Paul TANGUAY

ATTORNEY

INVENTOR
Jean-Paul TANGUAY

OSCILLATING TANDEM WHEELS

This invention relates to oscillating tandem wheels intended to be used on a heavy vehicle. More particularly, the present invention is directed to a driving wheels arrangement which is adapted to facilitate the traction and movement of a tree slasher when the latter rides over a rough and irregular surface.

In U.S. Pat. No. 3,500,882 issued Mar. 17, 1970 to Jean-Paul Tanguay, there is described a mobile tree slasher which has found many interesting uses. Particularly, this heavy piece of machinery has the advantage of being capable of moving on conventional roads. However, it goes without saying that a movable slasher must easily reach a site for tree cutting operations. It has been found that a mobile tree slasher such as the one described in the above patent cannot move with all ease over rough surfaces, especially in the bush, when it is equipped with a set of standard wheels.

In order to overcome the above disadvantages, I have invented a device adapted to facilitate the traction of a heavy vehicle over a rough and irregular surface. The device of may invention mainly comprises a pair of oscillating tandem wheels. Means are provided to allow free oscillation of the tandem wheels about a transverse axis which is located substantially between the axes of both tandem wheels and which preferably lies in the horizontal plane which extends to both wheel axes. Finally, there is a power arrangement on the heavy vehicle which is connected to drive at least one of the oscillating tandem wheels while allowing the tandem wheels to oscillate.

Preferably, the device according to the invention comprises a first frame and a second frame. The first frame is fixedly mounted alongside the heavy vehicle, the tandem wheels are mounted to rotate inside the second frame, while the latter is fittingly mounted to oscillate within the first frame.

In accordance with another embodiment of the invention there is a shaft for each of the tandem wheels, the shaft is transversely fixed inside the second frame and the tandem wheels are freely rotatable over the shafts.

At least one of the tandem wheels may be provided with an outwardly projecting hub which is formed with a sprocket wheel the latter being operatively connected to the power arrangement via chain means in order to drive the tandem wheel. Of course, both tandem wheels can be operatively connected to the power arrangement.

In accordance with yet another embodiment of the invention, the power arrangement can comprise the rear axle of the heavy vehicle, which rear axle is driven by an engine, a sprocket on axle at the end of the rear axle, a power transmission comprising a driving shaft which extends from outside the first frame to inside the second frame, a driving sprocket over the driving shaft outside the first frame and a double sprocket at the end of the driving shaft inside the second frame, at least one sprocket chain to connect the sprocket on axle to the driving sprocket and sprocket chains operatively connecting the double sprocket to the sprocket wheels.

Preferably, the power transmission comprises a braking system which can consist of a brake drum which is fixedly mounted on the driving sprocket, a brake shoe holding sleeve mounted over the driving shaft to permit the latter to rotate therein and a brake shoe held by the holding sleeve to be applied against the brake drum in order to decrease the speed of the driving sprocket.

In the drawings which illustrate the invention,

Figure 1:
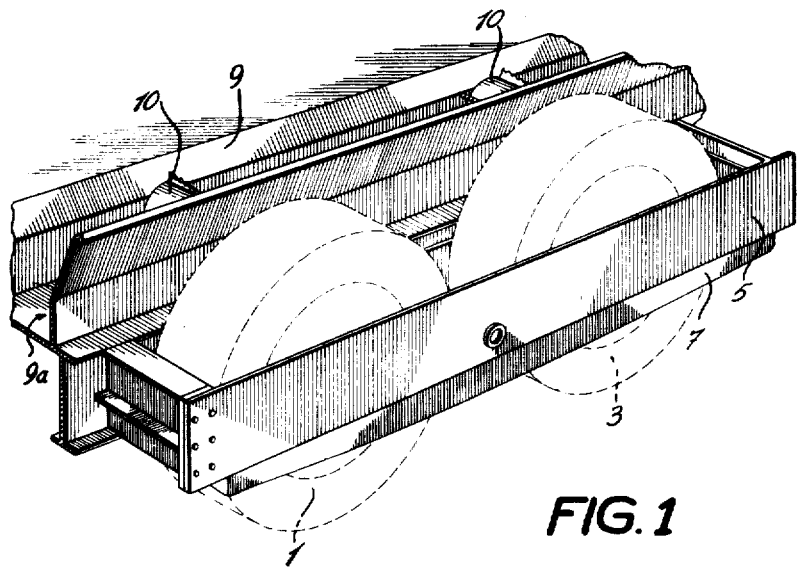
FIG. 1 is a perspective view of the oscillating tandem wheels according to the invention, mounted on a mobile tree slasher.

With reference to the drawings, the device illustrated will be seen to first consist of a pair of tandem wheels 1 and 3. The device also comprises a first outside frame 5 and a second oscillating inner frame 7. As illustrated in FIG. 1 of the drawings, the first frame 5 is mounted alongside a mobile three slasher 9, while the second frame 7 is fittingly inside the outside frame 5. As seen in FIG. 1 of the drawings the mobile tree slasher 9 is only partly illustrated. Only channel 9a and the log conveyors 10 are illustrated.

Figure 5:
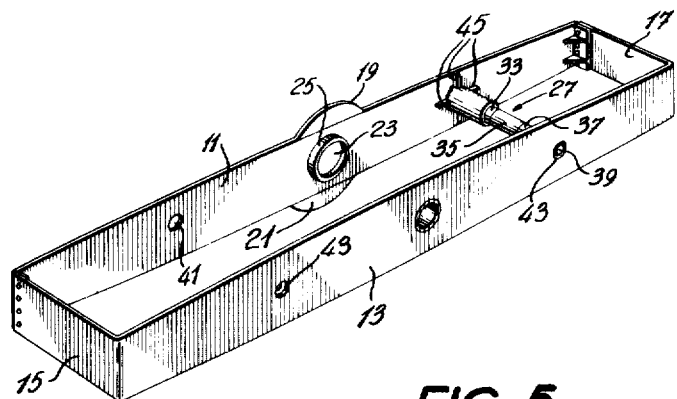
FIG. 5 is a perspective view of the oscillating inner frame.

With particular reference to FIG. 5 of the drawings, the second oscillating inner frame 7 consists of an inner plate 11, an outer plate 13 and two end plates 15, 17. The inner plate 11 has a middle arcuate widened upper portion 19 and a middle arcuate widened lower portion 21, the purpose of which is to reinforce the middle section of the inner plate because of the weakening effect caused by the opening 23 and outer spacer 25.

The wheels 1 and 3 are mounted inside frame 7 over respective wheels shafts 27. For the sake of clarity only one wheel shaft 27 has been illustrated in the drawings (see FIGS. 2 and 5).

Figure 2:
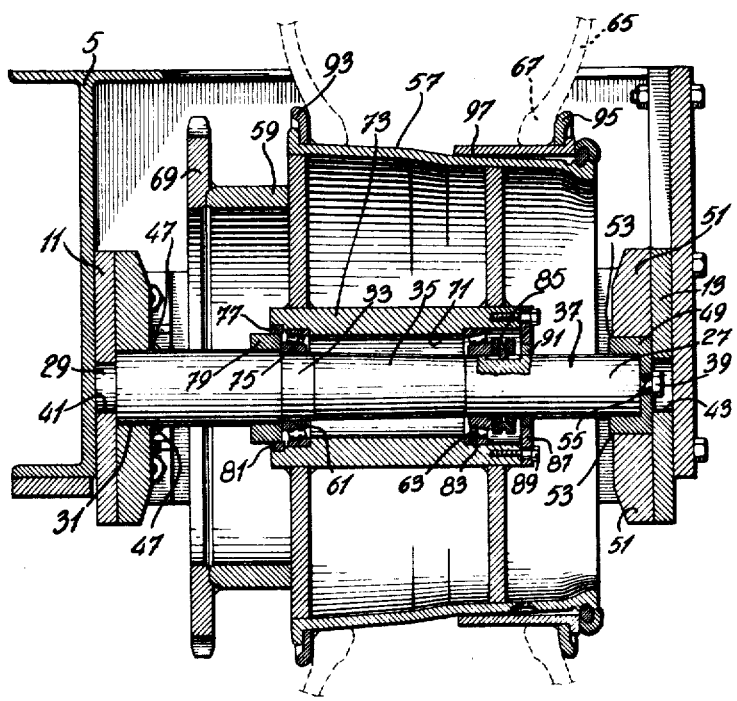
FIG. 2 is an axial cross-section view of one of the wheels.

With particular reference to FIG. 2 for a detailed illustration of a wheel shaft 27, the latter will be seen to consist from one end to the other (from left to right in FIG. 2) of a portion with reduced cross section 29, a shoulder portion 31, a minute portion 33, a tapered portion 35 and an end portion 37. The end portion 37 of the shaft 27 is threaded to receive lock screw 39, the purpose of which will be defined later.

To mount the shafts 27 inside the inside oscillating frame 7, the latter is formed with suitable openings 41 in the inner plate 11 and further openings 43 in the outer plate 13 (reference is made to FIG. 5). The end 29 of the shaft 27 is received in the opening 41 where the shaft 27 is firmly held by means of the four holding members 45 which are welded against the inner face of inner plate 11 and on the shoulder portion 35 of the shaft 27 (see the welding sports 47). Now with respect to the other end of the shaft 27, the end portion 37 is inserted in a collar 49 and the latter is fixedly held against the inner face of the outer plate 13 by means of holding members 51 which are welded against the inner face of the outer plate 13 and on the collar 49 (see the welding spots 53).

Turning back to the collar 49, it will be seen with respect to FIG. 2 of the drawings that it is formed with an opening 55 to permit the bolt 39 to pass through the rear portion of the collar 49 and to screw the bolt in the end portion 39 all in the manner illustrated in FIG. 2. The purpose of opening 43 in the outer plate 13 is therefore to give room to the head of the lock screw 39. Furthermore for dismounting the wheel shafts, it is only necessary to remove the outer plate 13 and to unscrew the lock screw 39.

For a particular arrangement of one of the tandem wheels 1, 3 reference is made to FIG. 2 of the drawings wherein it will be seen that the wheel 1 comprises a wheel rim 57, an outwardly projecting hub 59 and bearings 61 and 63. The wheel rim 57 is adapted as usual to receive tire of which only the side walls 65 and the bead 67 have been illustrated in dotted lines in FIG. 2. The hub 59 is formed with a sprocket wheel 69, the purpose of which will be explained in details hereinafter.

The bearing housing 71 is defined by a cylindrical member 73 having the particular shape illustrated in FIG. 2. There is provided a first annular depression 75 around the cylindrical member 73 and this will permit the mounting of bearing 61 between minute portion 33 of the shaft 27 and the annular depression 75. Immediately adjacent the annular depression 75 there is a second more pronounced annular depression 77 at the end of the cylindrical member 73. The reason for depression 77 is to mount stopper 79 and oil seal 81 between the shoulder portion 31 of the shaft 27 and the end of the cylindrical member 73.

At the other end of the cylindrical member 73, there is a third annular depression 83 which has the same depth as the depression 75 but is however wider to permit the insertion of bearing 63 and lock 85 between depression 83 and the end portion 37. To hermetically close the bearing housing 71, a flanged cap 87 is bolted with bolts 89 at the end of the cylindrical member and an oil seal 91 is mounted around the end portion 37 of the shaft 29 all in the particular manner again illustrated in FIG. 2 of the drawings.

Finally the rim 57 has collars 93 and 95 and bead seat 97 in order to mount the tire over the rim 57.

Figure 6:
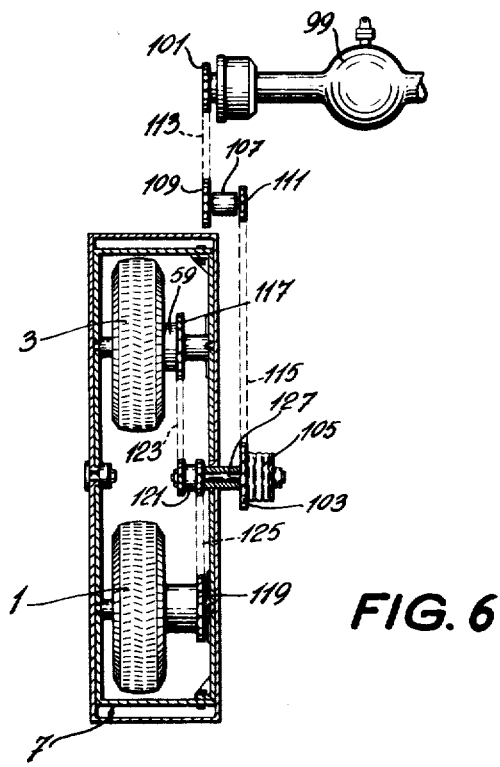
FIG. 6 is a view from above which illustrates the tandem wheels and the power arrangement used to drive them.

Turning now to FIG. 6 of the drawings, it will be realized that the power which is transmitted to the tandem wheels 1, 3 originates from the rear axle 99 of the mobile tree shasher 9, wherein the rear axle is driven by the engine mounted (not illustrated) on said mobile tree shasher 9.

At the end of the rear axle 99, there is a sprocket on axle 101 as illustrated. To laterally shift power from the sprocket on axle 101 to the 28 teeth driving sprocket 103 of the power transmission 105 there is provided a lateral counter shaft 107 of standard construction. In addition, there is an 18 teeth sprocket wheel 109 mounted at one end of the counter shaft 107 and a 14 teeth sprocket wheel 111 mounted at the other end of the counter shaft 107. From the drawings it will appear obvious that power is transmitted from the rear axle 99 to the power transmission 105 by first connecting the sprocket on axle 101 to the 18 teeth sprocket wheel 109 with sprocket chain 113, and secondly mounting sprocket chain 115 over 14 teeth sprocket wheel 111 and 28 teeth driving sprocket 103.

Power is then ready to be transmitted to both sprocket wheels 117 and 119 and this will be carried out via double sprocket 121 and the two sprocket chains 123 and 125. It will be noted that all the sprocket chains are illustrated in dotted lines in FIG. 6 of the drawings. It will also be noted that power will directly be transmitted from the driving sprocket 103 to the double sprocket 121 through the power transmission shaft 127 since both the driving sprocket 103 and the double sprocket are locked over the shaft 127.

Figure 4:
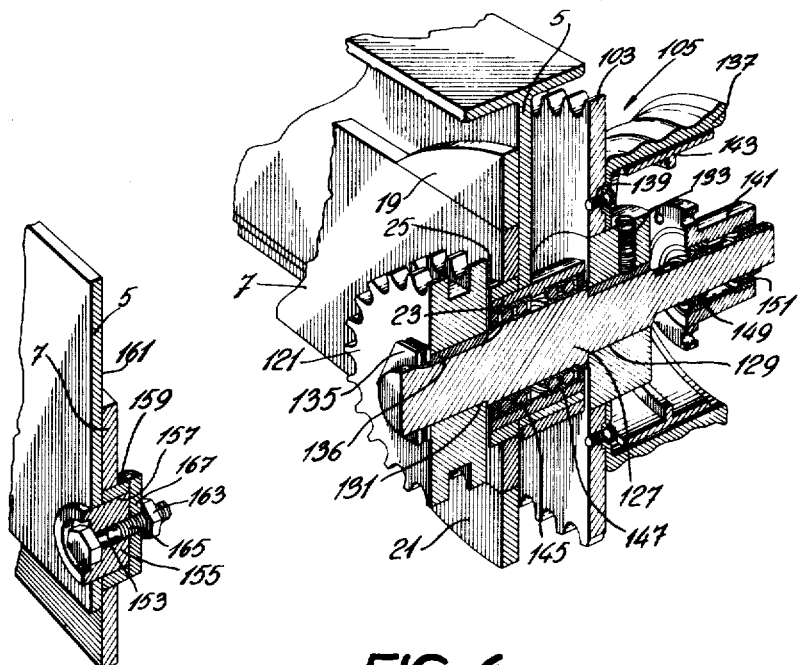
FIG. 4 is a partial perspective view of the power transmission and of the frame taken from the oscillating axis of the tandem wheels.

We now turn to FIG. 4 of the drawings for a detailed description of the power transmission 105. It has already been said that the device illustrated comprises a driving sprocket 103, a power transmission shaft 127 and a double sprocket 121. It will easily be realized that these elements form the essential components of the power transmission 105, and that it is essential that the power transmission shaft 127 extend from the exterior of both frames 5 and 7 to the interior of said frames all as illustrated in FIGS. 4 and 6 of the drawings. For this purpose, it will be required that both frames 5 and 7 have suitable openings. The opening which permits passage of the shaft 127 through the inner plate 11 has already been identified by reference numeral 23. The shaft 127 has two annular depressions 129 and 131 which will respectively be used to fixedly mount the driving sprocket 103 and the double sprocket 121. The driving sprocket 103 is locked with two set screws 133 and the double sprocket 121 is locked at the end of the shaft 127 by means of lock nut 135 and lock 136. Spacer 25 permits to specedly mount the double sprocket 121 away from the inner frame 7.

Finally, the power transmission 105 comprises a braking system which is made of a brake drum 137 that is fixedly mounted on the driving sprocket 103 by means of bolts 139, a brake shoe holding sleeve 141 mounted in a non rotatable fashion while allowing the shaft 127 to rotate therein, and a braked shoe 143 which is held by the brake shoe holding sleeve 141. In addition bearing 145, 147, 149 and 151 are mounted over the shaft to facilitate rotation thereof.

The outer plate 13 of the inner frame 7 is mounted to oscillated about an axis which is aligned with the power transmission shaft 127. This is made possible by providing a bolt opening 153 and extension 155 in the outer frame 5. The outer plate 13 provided with opening 157 and spacer 159 is laid against the inner face 161 of the outer frame 5 in the particular manner illustrated in FIG. 4 of the drawings and the two pieces are assembled by means of nut and bolt 163 and 165 and tightening spacer 167.

Figure 3:
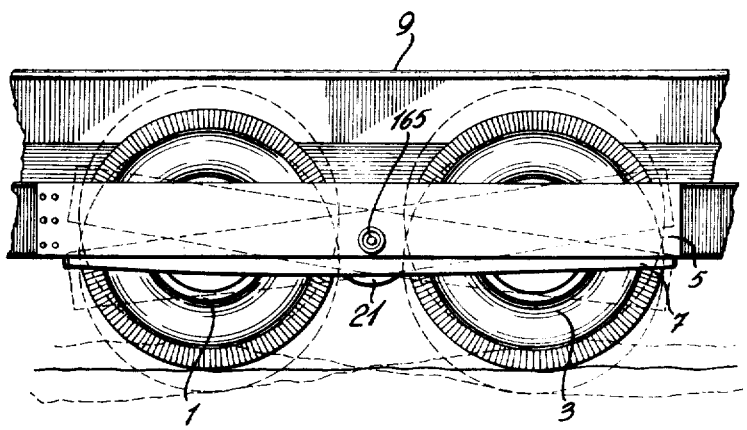
FIG. 3 is a side view illustrating the oscillation of the wheels, when the slasher rides over bumpy roads.

It will easily be realized with reference to FIG. 3 that an irregular surface will cause an oscillation of the inner frame 7 inside frame 5 about the axis defined by the bolt 165 and shaft 127.

Such a system of tandem wheels as described above enables the wheels on the left side of the heavy vehicle to be completely independent of the wheels which are on the opposite right side of the vehicle. For example this means that the front left wheels can occupy a lower position, while the front right wheels can be in a higher position. The above arrangement of oscillating tandem wheels permits a permanent contact with the ground whatever positions are occupied by the wheels and the irregularities on the ground. This would of course be completely impossible with rear axles of the rigid type in which case the latter would have to be mounted on a suspension which is flexible enough to permit a sufficient oscillation of the wheels. However, it will be obvious to those skilled in the act that a flexible suspension is not compatible with a heavy vehicle, such as a tree slasher, if the latter is provided with a conventional system having two axles of the rigid type.

I claim:

1. In a heavy vehicle, a device adapted to facilitate traction of said vehicle over rough and irregular surface, said device comprising:
   a. a first frame fixedly mounted alongside said heavy vehicle;
   b. a second frame fittingly mounted to oscillate inside said first frame;
   c. a pair of tandem wheels mounted to rotate inside said second frame;
   d. a shaft for each said tandem wheels, each said shaft transversely fixed inside said second frame, said tandem wheels freely rotatable over said shafts;
   e. a power arrangement mounted on said heavy vehicle;
   f. at least one of said tandem wheels being provided with an outwardly projecting hub;
   g. said hub formed with a sprocket wheel;
   h. chain means to operatively connect said sprocket wheel to said power arrangement to cause driving of said last named tandem wheel while allowing free oscillation of said second frame and said tandem wheels about said transverse axis.

2. The device according to claim 1, wherein both said tandem wheel are operatively connected to said power arrangement.

3. The device according to claim 2, wherein said power arrangement comprises a rear axle of said heavy vehicle, said rear axle driven by an engine, a sprocket on axle at the end of said rear axle, a power transmission comprising a driving shaft, said driving shaft extending from outside said first frame to inside said second frame, a driving sprocket over said driving shaft outside said first frame and a double sprocket at the end of said driving shaft inside said second frame, at least one sprocket chain to connect said sprocket on axle to said driving sprocket, and sprocket chains operatively connecting said double sprocket to both said sprocket wheels.

4. The device according to claim 2, wherein said power transmission comprises a braking system.

5. The device according to claim 1, wherein said second frame is mounted to oscillate about said driving shaft whereby said driving shaft defines said axis of oscillation.

6. The device according to claim 1, wherein said tandem wheels each comprise a rim and a tire mounted over said rim.

7. The device according to claim 6, wherein said braking system consists of a brake drum fixedly mounted on said driving sprocket, a brake shoe holding sleeve non rotatably mounted over said driving shaft and a brake shoe held by said holding sleeve to be applied against said brake drum to decrease the speed of said driving sprocket.

8. The device according to claim 7, wherein said axis of oscillation is located midway between the axes of said wheels, said axis lying in the horizontal plane which extends to both said axis.

* * * * *